(12) United States Patent
Scherping et al.

(10) Patent No.: US 9,930,496 B2
(45) Date of Patent: Mar. 27, 2018

(54) TRIGGER-BASED TRANSFER OF CAR2X MESSAGE OF DIFFERENT STANDARDS

(71) Applicant: Continental Teves AG & Co. oHG, Frankfurt (DE)

(72) Inventors: Richard Scherping, Liederbach am Taunus (DE); Ulrich Stählin, Eschlborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/526,177

(22) PCT Filed: Dec. 7, 2015

(86) PCT No.: PCT/EP2015/078839
§ 371 (c)(1),
(2) Date: May 11, 2017

(87) PCT Pub. No.: WO2016/096507
PCT Pub. Date: Jun. 23, 2016

(65) Prior Publication Data
US 2017/0332206 A1    Nov. 16, 2017

(30) Foreign Application Priority Data

Dec. 18, 2014 (DE) .................... 10 2014 226 465

(51) Int. Cl.
*H04B 1/06* (2006.01)
*H05K 11/00* (2006.01)
(Continued)

(52) U.S. Cl.
CPC ............. *H04W 4/046* (2013.01); *H04L 69/08* (2013.01); *H04W 4/005* (2013.01); *H04W 4/12* (2013.01)

(58) Field of Classification Search
CPC ....... H04W 4/046; H04W 4/005; H04W 4/12; H04L 69/08
See application file for complete search history.

(56) References Cited

U.S. PATENT DOCUMENTS

| 9,334,503 B2 | 5/2016 | Stahlin et al. |
| 2014/0121891 A1 | 5/2014 | Barrett et al. |

(Continued)

FOREIGN PATENT DOCUMENTS

| DE | 102010002092 A1 | 12/2010 |
| DE | 102010029482 A1 | 12/2010 |

(Continued)

OTHER PUBLICATIONS

International Search Report and Written Opinion for International Application No. PCT/EP2015/078839, dated Feb. 26, 2016, 11 pages.

(Continued)

*Primary Examiner* — Nguyen Vo
(74) *Attorney, Agent, or Firm* — RatnerPrestia

(57) ABSTRACT

A method for processing Car2X messages by a processing device designed to receive and process messages, the construction of which is defined according to different standards, preferably according to a first standard and a second standard, including: recording of the message by the processing device, identifying the standard used by the message, forwarding the message to an application unit of the processing device if the message uses the standard for which the application unit is designed, or otherwise creating a new message from the received message so that it can be processed by the application unit. The new message is created in accordance with at least one previously known content item within the received message.

11 Claims, 1 Drawing Sheet

(51) Int. Cl.
  *H04W 4/04*  (2009.01)
  *H04W 4/12*  (2009.01)
  *H04L 29/06* (2006.01)
  *H04W 4/00*  (2018.01)

(56) References Cited

U.S. PATENT DOCUMENTS

2014/0122757 A1    5/2014  Barrett et al.
2017/0025012 A1*   1/2017  Thompson ............. G08G 1/162

FOREIGN PATENT DOCUMENTS

EP    2806285 A1    11/2014
WO    2014048486 A1  4/2014

OTHER PUBLICATIONS

German Search Report for German Application No. 10 2015 224 445.8, dated Mar. 16, 2016, including partial English translation, 10 pages.
"Intelligent transport systems—Communications access for land mobiles (CALM)", European Telecommunications Standards Institute (ETSI), Sophia-Antipolis, France, vol. ITS, Apr. 8, 2014, pp. 1-60, XP014184913, [retrieved on Apr. 8, 2014].

* cited by examiner

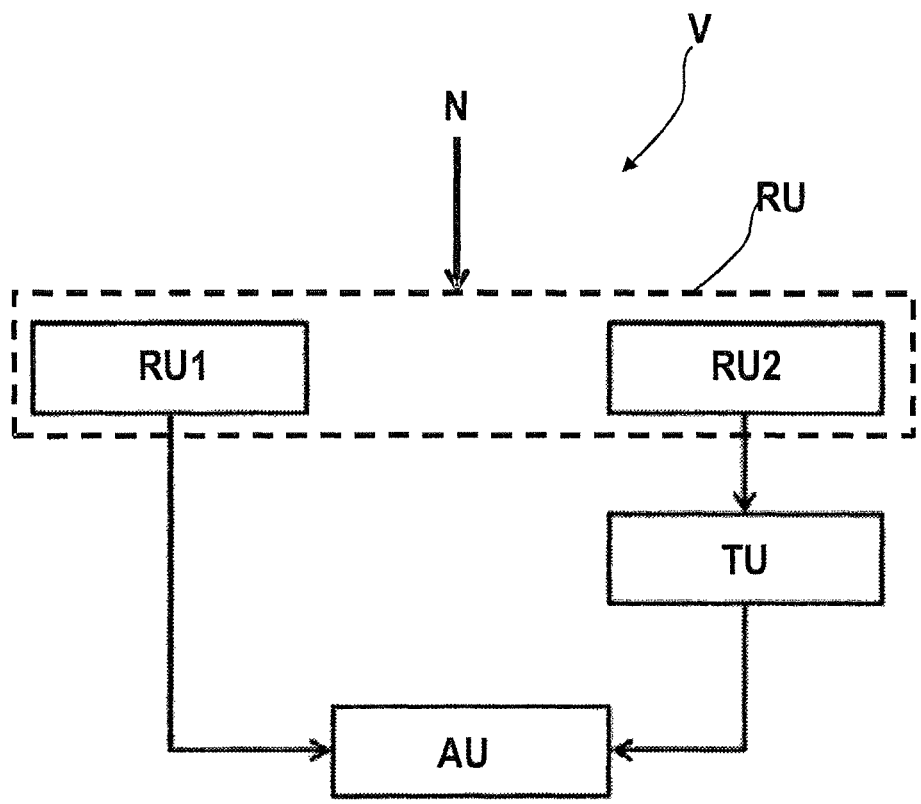

TRIGGER-BASED TRANSFER OF CAR2X MESSAGE OF DIFFERENT STANDARDS

CROSS REFERENCE TO RELATED APPLICATIONS

This application is the U.S. National Phase Application of PCT International Application No. PCT/EP2015/078839, filed Dec. 7, 2015, which claims priority to German Patent Application No. DE 10 2014 226 465.0, filed Dec. 18, 2014, the contents of such applications being incorporated by reference herein.

FIELD OF THE INVENTION

The invention relates to a method for processing Car2X messages using a processing facility, a transfer unit of this processing facility and a control apparatus for a Car2X device.

BACKGROUND OF THE INVENTION

The structure and, in part, also the content of messages for vehicle-to-X communication (abbreviated below as Car2X) is determined by different standards depending on the region. For example, in Europe, Car2X messages are classified as cyclically sent messages, so-called "Cooperative Awareness Messages" (CAM) and event-controlled messages, so-called "Decentralized Environmental Notification Message" (DENM). In North America, however, this classification is not made. Instead, a single message type is used, the so-called "Basic Safety Messages" (BSM).

The different types of messages according to the standards lead to a situation in which the applications which are based on them must be developed in such a way that they are adapted to them. This has the disadvantage that a double development of the applications is required. Further, vehicles which are only designed for one of the standards cannot be operated in the region where another standard is dominant.

SUMMARY OF THE INVENTION

An aspect of the invention is thus to show a possibility whereby these disadvantages can be avoided.

An aspect of the invention is based on the general principle of continuing to design or render compatible the application unit only for one standard, and messages which are structured according to another standard must be converted, or starting from these messages, new messages must be generated, so that they can be processed by the application unit. Here, the fact is taken into account that it is advantageous not to generate a message according to a fixed schema, but to implement it depending on at least one already known content. In other words, the received message is checked as to whether it contains an already known content, or such that can be taken into account when generating the new message. This has the advantage that the new message can be generated in such a way that it is adapted to the respective content of the received message. Further, only in this manner can a decision also be made as to the type of message into which the received message should be transferred. This case should be particularly taken into account when a message according to the North American standard needs to be transferred to the European standard. Conversely, the generation of the new message can be achieved more quickly when the relevant content is taken into account, since in this manner, the fields or data to be filled in the message has already been recognized.

The pre-known content within the received message presents very targeted information, by means of which the received message can be relatively quickly classified or graded. In general, it can remain open as to whether the originally received message is transferred into a new message, for example by means of modification of the received message, or whether an entirely new message, i.e. a new data record, is generated. To this extent, the term "generate" can be understood for both types.

According to one advantageous embodiment of the method according to the invention, the pre-known content is suitable for describing a traffic event. In particular, in view of the fact that event-related messages are defined according to the European standard, by means of this embodiment a classification can already be made at a very early stage between two types of message. In this manner, a particularly rapid evaluation of the received message is possible.

According to one advantageous embodiment of the method according to the invention, by means of at last one content, an application case is detected that is known to the application unit, or an application case is derived from several content items. Alongside the definition of pre-known content items by means of traffic events, a definition of the content can also be made via pre-defined application cases.

According to one advantageous embodiment of the method according to the invention, the pre-known content comprises a pre-defined trigger condition. By means of a pre-defined trigger condition or a trigger, an evaluation of the received message can be achieved particularly quickly and simply.

According to one advantageous embodiment of the method according to the invention, the trigger condition is defined according to the standard used by the application unit. The application unit can determine one or more trigger conditions for certain traffic events or application cases. It is possible that this trigger condition cannot precisely be found in the message according to the other standard. However, it is sufficient when the comparable condition is contained in the other message.

According to one advantageous embodiment of the method according to the invention, when the new message is generated, the contents of the received message are only partially taken into account. In this manner, a particularly efficient generation of a new message is possible.

In particular, according to one advantageous embodiment of the method according to the invention, only those contents are taken into account which are required for determining and/or assessing a traffic event or application case.

According to one advantageous embodiment of the method according to the invention, a message of a first type is generated when at least one pre-known content is contained in the received message, and a message of a second type is generated when a pre-known content is not contained in the received message. Alternatively, it is possible to implement the method such that each type of incoming message is always transferred into a single type of an outgoing message.

According to one embodiment of the method according to the invention, it is particularly advantageous that the application unit is designed in such a way that it processes two different types of message, wherein the first type is dependent on an event and the second type is not dependent on an event, wherein new messages of the first or second type are generated from messages which do not provide this classification. Advantageously, the first type of message is a DENM and the second type of message is a CAM.

The invention further comprises a transfer unit of a processing facility for processing Car2X messages, wherein the transfer unit features an entrance for receiving a message and an exit for issuing a message, and is designed such that from the incoming message, a new message is generated and issued, characterized in that the new message is generated in dependence on at least one pre-known content within the received message.

Further advantageous embodiments of the transfer unit are formed in combination with the features of the above-named embodiments of the method according to the invention.

Furthermore, the invention comprises a control apparatus for a Car2X device with a processing unit for processing Car2X messages and a transfer unit according to the above embodiments.

BRIEF DESCRIPTION OF THE DRAWINGS

The invention will now be described in greater detail with reference to an exemplary embodiment, several example cases, and a FIGURE, in which:

FIG. 1 shows a schematic view of a processing unit with an exemplary embodiment of the transfer unit according to the invention.

DETAILED DESCRIPTION OF THE PREFERRED EMBODIMENTS

FIG. 1 shows schematically the structure of a processing facility V for processing Car2X messages.

The processing facility V features a receiving unit RU with two blocks or separate receiving units RU1, RU2, which receive messages of different standards. In this exemplary embodiment, these are the European standard for Car2X messages on the one hand and the North American standard on the other. Via the first receiving unit RU1, messages are received and forwarded according to the European standard, in particular result-based messages, such as DENM. However, it is also possible to receive cyclical messages via the first receiving unit RU1, such as CAM. The second receiving unit RU2 is provided to receive and forward messages according to the North American standard, such as BSM. Alternatively, the receiving unit RU can be designed without the dual division.

The processing facility V further features an application unit AU, which uses the messages to provide applications. The application unit AU is directly coupled to the first receiving unit, so that messages N which are received by the first receiving unit RU1 are forwarded unchanged to the application unit. Messages which are structured according to the North American standard cannot be directly processed by the application unit AU. These are transferred into new messages, which feature the structure of the European standard, by means of a transfer unit TU.

When a message is received, the following method is implemented in order to generate the new message. The processing facility V adopts the message via the receiving unit RU or receiving units RU1, RU2, wherein during reception, it is recognized which standard the message uses. The message is forwarded to the application unit AU if the message uses the European standard for which the application unit is designed. Otherwise, a new message is generated from the received message, so that it can be processed by the application unit, wherein the new message is generated in dependence on at least one pre-known content within the received message. For this purpose, the message is checked or scanned for certain contents.

By means of at least one pre-known content, an application case known to the application unit can be recognized by the transfer unit. An application case can also be derived from several contents. Alternatively, the content can be suitable for describing a traffic event. An application can here also be a traffic event at the same time.

In the ideal scenario, the pre-known content comprises one or more pre-defined trigger conditions, which is coupled to an application case or a traffic event. For certain application cases or traffic events, at least one trigger condition is defined according to the European standard. Thus, it is advantageous to check the message for such trigger conditions according to the North American standard, or for analogous or equivalent contents. Three examples in this regard are described below.

One application case represents the activation of an electronic emergency brake light, the so-called "Dangerous Situations—Electronic Emergency Brake Light" case. This application case can be recognized according to the European standard when the following contents or trigger conditions are contained in the DENM:

a signal is recognized which requests the electronic emergency brake light, and the delay of the vehicle is less than $-4$ m/s$^2$.

A message according to the North American standard or a BSM can be checked in one step by means of the transfer unit as to whether a content is contained in the message which states that the delay is less than $-4$ m/s$^2$, and whether a content is contained in the message which states that the vehicle speed of the transmitting vehicle is above a certain threshold, such as 50 km/h.

As an option, the information can also be evaluated as to whether the ABS is activated if this optional content is contained in the BSM. Alternatively, it is also feasible that the optional content "Hard Braking" is also sent as information. This content can be used to recognize the above-named application case.

One example for a traffic event is a use of an emergency services vehicle, which is defined as a so-called "Special Vehicle Warning—Emergency Vehicle in operation" application case according to the European standard. The pre-known contents here, which act as trigger conditions, are:

a) the all-round light of the emergency services vehicle is in use.

Further trigger conditions (optional) which improve the recognition of the application case, are b) the sirens are in use c) the current speed of the vehicle is greater than 0 km/h.

A data field that is analogous to trigger condition a) is contained in the BSM message so that in this case, the message can be directly checked for this trigger condition, in which it is determined whether the optional field "Light Bar in use" is also sent and contains the value "true".

In parallel, it can be checked whether in the BSM, a so-called "Emergency Vehicle Approaching Message" is contained which also leads to a conclusion that an emergency services vehicle is present. In this case, the new message would be generated in dependence on several pre-known contents.

A third example is a standing vehicle, or one that has been left standing. The so-called "Stationary Vehicle Warning—

Stopped Vehicle" traffic event is defined according to the European standard when the following applies:
the related vehicle has activated its warning lights
the speed of the affected vehicle is 0 km/h, and
the trigger meter has expired.

All three conditions are checked within a recognition cycle. Here, a trigger meter or trigger timer is set for a recognition cycle. The start value of the trigger meter is 30 seconds [s] and is set as soon as the vehicle has a speed of 0 km/h and the warning lights have been activated.

The trigger meter is reduced by the following events:
a) the meter is reduced by 10 s when the automatic gear change is in parking position for at least 3 s,
b) the meter is reduced by 10 s when the automatic gear change is on idle for at least 3 s,
c) the meter is reduced by 10 s when the handbrake is in a pulled state for at least 3 s,
d) the meter is reduced by 10 s when a number of seatbelts are in a loosened state for at least 3 s,
e) the meter is reduced by 10 s when a number of doors are opened for at least 3 s,
f) the meter is set to 0 when the ignition is switched off for at least 3 s,
g) the meter is set to 0 when the rear door is opened for at least 3 s,
h) the meter is set to 0 when the engine hood is opened for at least 3 s.

The above events for reducing the trigger meter can only be used once in each case. When the meter has adopted the value 0, no further check is necessary for reducing the meter for the respective recognition cycle. During the entire recognition cycle, the warning light must be activated and the speed must equal 0 km/h. Otherwise, recognition is stopped.

On the basis of this example, it becomes clear that in order to detect an application case or a traffic event, several contents, including comprising trigger conditions, are required in order to recognize the case or event in question.

In the North American standard, not all known contents from the European standard are included in the message. It is therefore checked whether analogous contents are present, or whether such a case or event can be derived from several contents. This behavior is thus based on the BSM. For this purpose, the speed information from the BSM is used, and additional optional information is checked, if available, such as
warning light status
gear change status
auxiliary brake status.

It can be advantageous to use a concordance table or similar, which contains contents that are analogous or equivalent to each other. Here, for example, it could be defined which data can be used that are equivalent to each other.

Since, as is shown by this example, only a portion of the contents is relevant in the message according to the North American standard in order to reproduce the respective case or event, it is advantageous when generating the new message that the contents of the received message are only partially taken into account. Those contents are taken into account which are required for determining a traffic event or application case.

Furthermore, it may occur that a message features no content according to the North American standard which points to an application case or a traffic event. For this reason, it is advantageous to implement the method such that a message of a first type is generated, e.g. DENM, when at least one pre-known content is contained in the received message, and a message of a second type is generated, e.g. CAM, when a pre-known content is not contained in the received message.

Accordingly, the application unit should be designed such that it can process two different types of message, wherein the first type is event-dependent and the second type is not event-dependent, wherein new messages of the first or second type are generated from messages which do not provide this classification.

The claims that are a part of the application do not represent any waiver of the attainment of further protection.

Insofar as it emerges during the course of the method that a feature or a group of features is not absolutely necessary, on the part of the applicant, the aim is now already to create a formulation of an independent claim which no longer comprises the feature or the group of features. This can for example be a sub-combination of a claim present on the date of submission, or a sub-combination restricted by further features of a claim present on the date of submission. Such claims or feature combinations to be newly formulated should be regarded as also being covered by the disclosure of this application.

Notification is also made that designs, features and variants of the invention which are described in the different embodiments or exemplary embodiments and/or shown in the FIGURES can be combined in any way desired. Single or multiple features can be interchanged as required. Feature combinations which arise from this are to be understood as being also covered by the disclosure of this application.

References in dependent claims should not be understood as a waiver for the achievement of an independent, material protection for the features of the subclaims to which reference is made. These features can also be combined as required with other features.

Features which are only disclosed in the description, or features which are only disclosed in the description or in a claim in connection with other features, can in general be of independent significance which is essential to the invention. They can therefore also be adopted individually into claims as a differentiation from the prior art.

The invention claimed is:

1. A method for processing Car2X messages by a processing facility, which is designed in such a manner that it can receive and process messages the structure of which is defined according to a first and a second standard, comprising:
receiving of the message by the processing facility,
detecting the standards used by the message,
forwarding the message to an application unit of the processing facility, when the message uses the standard for which the application unit is designed,
otherwise, generating a new message from the received message, so that it can be processed by the application unit,
wherein the new message is generated in dependence on at least one pre-known content within the received message.

2. The method according to claim 1, wherein the pre-known content is suitable for describing a traffic event.

3. The method according to claim 1, wherein based on at least one content, an application case is detected that is known to the application unit, or an application case can be derived from several content items.

4. The method according to claim 1, wherein the pre-known content comprises a pre-defined trigger condition.

5. The method according to claim 4, wherein the trigger condition is defined according to the standard used by the application unit.

6. The method according to claim 1, wherein when the new message is generated, the contents of the received message are only partially taken into account.

7. The method according to claim 6, wherein only those contents are taken into account which are necessary for determining and/or assessing a traffic event or application case.

8. The method according to claim 1, wherein a message of a first type is generated when at least one pre-known content is contained in the received message, and a message of a second type is generated when a pre-known content is not contained in the received message.

9. The method according to claim 1, wherein the application unit is designed to process two different types of message, wherein a first type is event-dependent and a second type is not event-dependent, wherein new messages of the first or second type are generated from messages which do not provide an event classification.

10. A transfer unit of a processing facility for processing Car2X messages, wherein the transfer unit features an entrance for receiving a message and an exit for issuing a message, and which is configured to implement a method for processing Car2X the messages by the processing facility, which is designed in such a manner that it can receive and process messages the structure of which is defined according to a first and a second standard, comprising:
  receiving of the message by the processing facility,
  detecting the standards used by the message,
  forwarding the message to an application unit of the processing facility, when the message uses the standard for which the application unit is designed,
  otherwise, generating a new message from the received message, so that it can be processed by the application unit,
  wherein the new message is generated in dependence on at least one pre-known content within the received message.

11. A control apparatus for a Car2X device with a processing unit for processing Car2X messages and a transfer unit according to claim 10.

* * * * *